Nov. 26, 1929.  W. B. JUPP  1,737,161
GAS LINE FEED
Filed Aug. 19, 1927
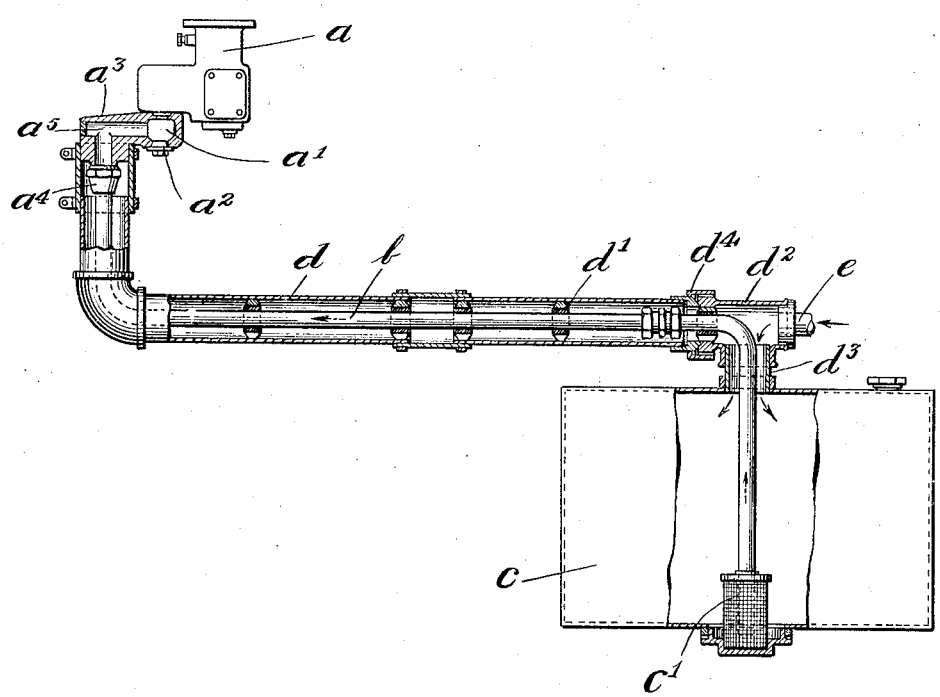
INVENTOR.
William B. Jupp
BY
Redding, Greeley, O'Shea & Campbell
his ATTORNEYS.

Patented Nov. 26, 1929

1,737,161

UNITED STATES PATENT OFFICE

WILLIAM B. JUPP, OF BROOKLYN, NEW YORK, ASSIGNOR TO INTERNATIONAL MOTOR COMPANY, OF NEW YORK, N. Y., A CORPORATION OF DELAWARE

GAS-LINE FEED

Application filed August 19, 1927. Serial No. 214,127.

The present invention relates to methods of protecting gasoline lines, particularly where there is a constant flow of fuel therethrough.

More particularly, the invention relates to gas lines through which gasoline flows under pressure, the feature contemplated by the invention being that of cutting off the flow before breakage of the line occurs, thus preventing explosion or fire due to continued flow of the fuel after breakage of the line occurs.

A further object of the invention is to provide a sealed gas line characterized by the fact that, when the seal is broken, the flow of gas through the gas pipe stops. In addition to the above, the line is designed and constructed to provide a protection which, in addition to performing the above function, serves as a strengthening means for the gas pipe, the latter being mounted yieldingly within the protective jacket to permit a desirable degree of flexibility.

Further and other objects of the invention will appear as the description proceeds and reference will now be had to the accompanying drawing, forming a part hereof, for a more detailed description, wherein:

The single figure of the drawing shows an elevation, partly broken away, and in section, of a preferred form of the present invention.

Referring particularly to the drawing, $a$ designates a carbureter of well known construction provided with a depending fitting $a'$ through which gas may be fed thereinto. Secured to the fitting $a'$ by means of bolt and washer $a^2$ is an L-fitting $a^3$ to which the gas line is connected by means of nut $a^4$ which is threaded over the fitting $a^3$. Within the fitting, a channel $a^5$ is provided to permit the flow of gas therethrough.

$b$ designates a suitable gas line which may be made of a desired size and is secured at one end to the fitting $a^3$ by means of nut $a^4$, and at the other end in the gasoline supply tank $c$. A suitable screen $c'$ is provided to prevent sediment from being carried to the carbureter.

In order that the safety precaution mentioned above be effected and at the same time the proper construction for a pressure feed, the gas line $b$ is surrounded by pipe sections $d$. These pipe sections are secured together through suitable fittings which are rendered airtight, the interior thereof being provided with spaced non-metallic spiders $d'$ to position the gas line $b$ properly within the pipe $d$. A T-section $d^2$ is connected to the gasoline tank through a pipe section $d^3$ and, by means of a suitable flanged nut $d^4$, secures the end of the pipe line $d$ thereto. Opposite the line $d$, pipe $e$ is secured to the fitting and extends from the train pipe which carries the air, under pressure, to the various points on the car. By means of this pipe connection, the desired pressure is applied to the surface of the liquid in the tank $c$ and the gasoline is forced through the gas line $b$ to the carbureter $a$. Should any stresses occur along the gas line they will be taken first by the pipe $d$ which will be ruptured before rupture of the pipe $b$ occurs. As soon as the outer pipe is ruptured, the air pressure is removed from the surface of the liquid in the tank and the flow of fuel through line $b$ ceases. This serves as a safety precaution in case of rupture since the likelihood of fire or explosion is reduced to a minimum.

It will be apparent, from the above description, that the respective lines may be rendered flexible, or inflexible, as desired and the elements constituting the present device may be varied to suit individual requirements. The scope of the invention, however, is not to be limited save as defined in the appended claim.

What I claim is:

In a system for withdrawing fluid from a supply container, the combination of a fluid carrying line, a pressure jacket surrounding said line and communicating with the container whereby the pressure may cause the flow of fluids through the line, and spiders having openings therein lengthwise of the pipe for transmitting pressure to the container, said spiders comprising homogeneous units formed entirely of yielding non-metallic material and being interposed between the line and the jacket for yieldingly mounting the latter on the former.

This specification signed this 17th day of August A. D. 1927.

WILLIAM B. JUPP.